United States Patent [19]

Kasik et al.

[11] 4,428,903
[45] Jan. 31, 1984

[54] FUEL ROD FISSION GAS CRIMPING ARRANGEMENT AND METHOD

[75] Inventors: James E. Kasik; Frank D. Qurnell; David K. Dennison, all of San Jose, Calif.

[73] Assignee: General Electric Company, San Jose, Calif.

[21] Appl. No.: 253,090

[22] Filed: Apr. 13, 1981

[51] Int. Cl.³ .............................. G21C 19/20
[52] U.S. Cl. ................... 376/261; 376/253; 376/451; 29/400 N
[58] Field of Search ............. 376/251, 253, 261, 272, 376/450, 451, 463; 29/402.16, 402.19, 400 N, 517, 723

[56] References Cited

U.S. PATENT DOCUMENTS

| 2,064,129 | 12/1936 | Temple, Jr. | 29/517 |
| 2,710,677 | 6/1955 | Ferris | 29/517 |
| 2,958,929 | 11/1960 | Vineberg et al. | 29/517 |
| 3,115,797 | 12/1963 | Howe | 29/517 |
| 3,964,967 | 6/1976 | Nelson | 376/451 |
| 4,152,206 | 5/1979 | Jabsen | 376/451 |
| 4,229,259 | 10/1980 | Vaill et al. | 29/400 N |
| 4,309,250 | 1/1982 | Bradley | 376/451 |

Primary Examiner—Sal Cangialosi
Attorney, Agent, or Firm—Ivor J. James, Jr.; Samuel E. Turner; Raymond G. Simkins

[57] ABSTRACT

An arrangement for crimping a malleable sleeve over a hole in a punctured nuclear fuel rod in order to prevent the escape of fission gases into the external environment. The arrangement operates underwater and includes jaws for crimping the sleeve onto the fuel rod, which are operated by a hydraulic cylinder. The jaws crimp circumferential sealing ridges onto the inner surface of the sleeve, which bear against the fuel rod.

11 Claims, 5 Drawing Figures

FUEL ROD FISSION GAS CRIMPING ARRANGEMENT AND METHOD

BACKGROUND

Nuclear reactors, such as those described in "Nuclear Power Engineering," M. M. El-Wakil, McGraw-Hill Book Company, Inc., 1962, have been producing electricity by generating steam to drive turbines for many years. The steam is generated by heat from nuclear fuel rods arranged in vertical bundles in a reactor core.

The design of nuclear fuel rods has been improved significantly over the years. Scientists continue to research and develop new solutions to improve the operational reliability of the rods. To promote the continued improvement of fuel rods, it is desirable to study the fission gases generated within fuel rods during reactor operation. To study these gases, irradiated fuel rods are individually punctured in a subaqueous environment to release the fission gases for capture and examination.

Submerging the fuel rods protects the scientists from undue radiation exposure. A service pool adjacent the wet well and pressure vessel housing the reactor core is a convenient location to capture the fission gases.

A selected fuel rod is withdrawn from its bundle for penetration. Withdrawal may take place after the fuel bundle has been partially disassembled. U.S. patent application Ser. No. 177,097, filed Aug. 11, 1980, shows one way to disassemble a fuel bundle. After withdrawal from the bundle, penetration, and capture of fission gas, this selected fuel rod is stored underwater for an indefinite period of time. A certain amount of fission gas inevitably leaks through the punctured hole. This gas is radioactive, and even though only trace amounts are released into the fuel storage pool, concern has been expressed regarding the wisdom of permitting fission gases unconstrained access to the service pool.

It is accordingly an object of the instant invention to contain fission gases leaking through a puncture hole in a nuclear fuel rod.

Another object of the instant invention is remotely and sealingly to crimp a malleable sleeve over the puncture hole through which fission gases escape from underwater nuclear fuel rods.

SUMMARY OF THE INVENTION

These and other objects of the invention are achieved by the crimping arrangement and method described in detail herein. Sealable crimping is effectively accomplished by remotely positioning a malleable sleeve over an underwater puncture hole through which fission gases might escape or leak. A hydraulically operated crimping mechanism forms a pair of sealing ridges (one on each side of the puncture hole) between the malleable sleeve and the punctured fuel rod by crimping the malleable sleeve with its jaws. The crimping mechanism and the malleable sleeve are positioned or arranged in a housing underwater at the side of a service pool. A hydraulic piston mounted in the housing shuts the jaws on the malleable sleeve and fuel rod, after these have been positioned between the jaws by an operator utilizing selected grapple tools to maneuver rod and sleeve into the housing. At the appropriate moment, the jaws clench, securing the malleable sleeve onto the fuel rod and over the puncture hole.

DRAWING OF A PREFERRED EMBODIMENT

The invention will be better understood from the accompanying description of the preferred embodiment taken in conjunction with the accompanying drawing, wherein:

FIG. 1 is an isometric diagram illustrating the sealing sleeve crimping arrangement;

FIG. 2 displays a malleable sleeve crimped over a puncture hole in the fuel rod through which fission gas leaks;

DESCRIPTION OF A PREFERRED EMBODIMENT OF THE INVENTION

Figure 1:
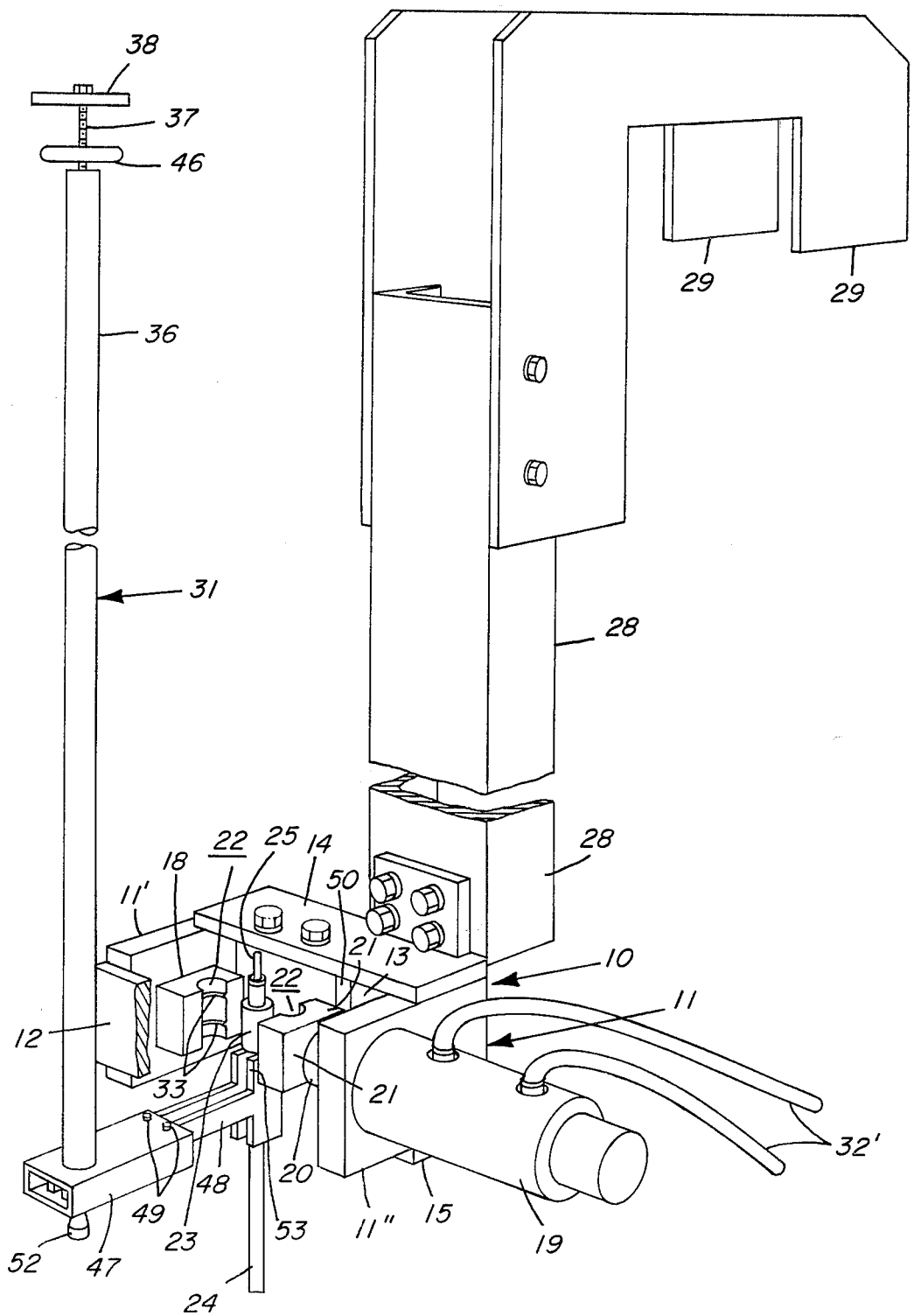
Figure 2:
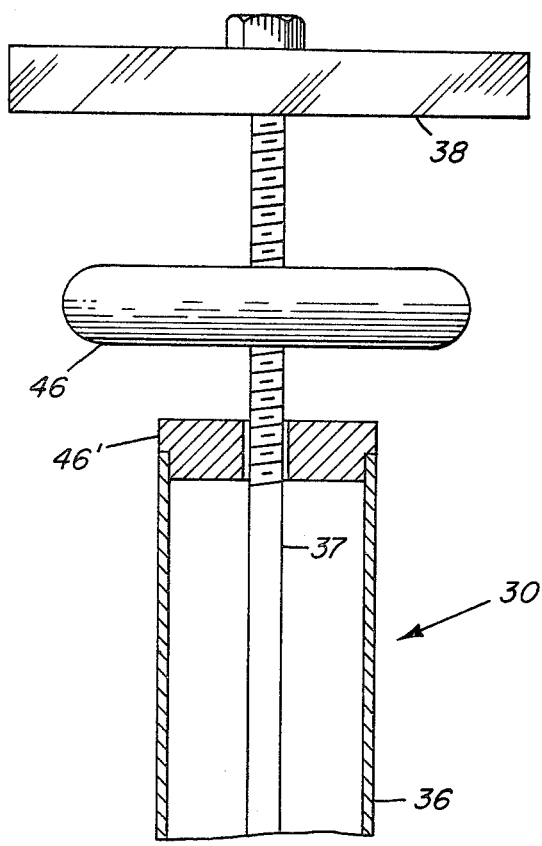
Figure 2:
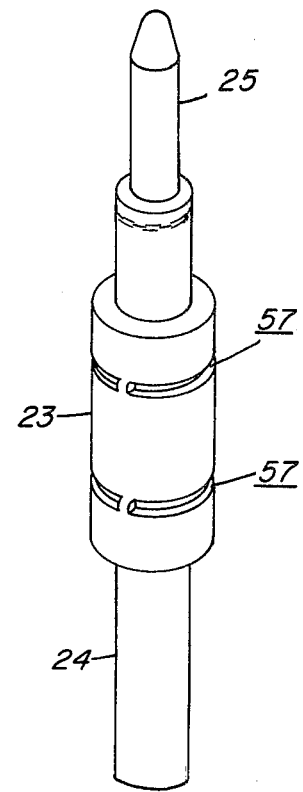

A preferred embodiment of this invention is shown in FIG. 1. The crimping arrangement shown includes a supporting housing 10 including sides 11, front 12 (broken away), back 13, top 14, and bottom 15. One side 11' supports a fixed jaw 18. A hydraulic cylinder 19 including a piston (not shown) and a shaft 20 supporting a moveable jaw 21 is mounted through an aperture in the side 11''. The fixed and moveable jaws together define a surface contour 22 for receiving a malleable sleeve 23 therebetween, which is destined to be positioned over a significant aperture or puncture hole in a fuel rod 24 sealed at its ends by so-called end plugs 25. The malleable sleeve may for example be fashioned of 1100 or 6061 series aluminum which has been annealed in order to soften it for crimping. In time and after crimping, the material rehardens and holds its shape. Two jaws opening and closing, or more than two jaws in cooperative operation, can be employeed to successfully work this invention.

Figure 5:
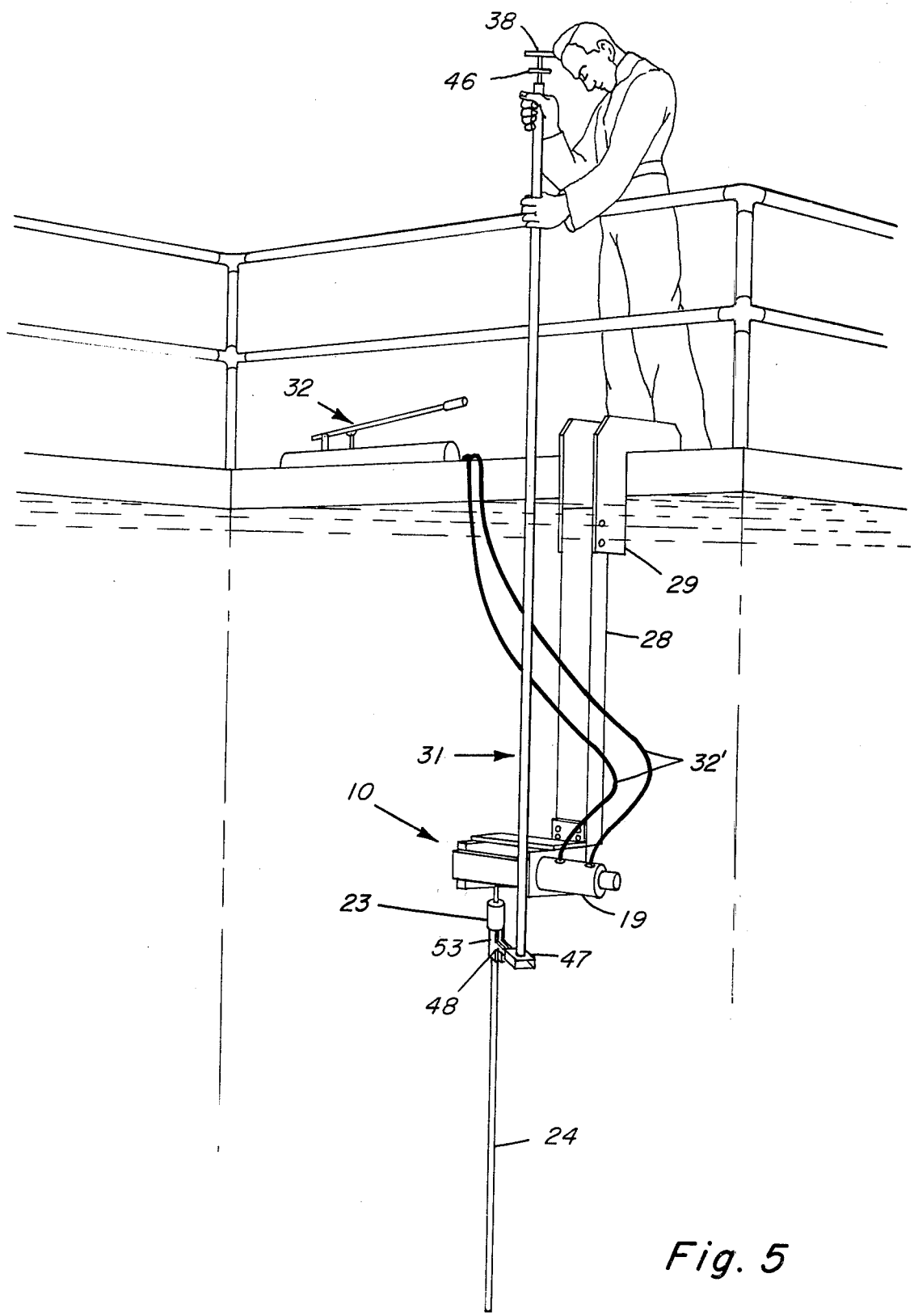
FIG. 5 illustrates an operator operating the crimping arrangement at the side of a service pool.

The supporting housing 10 is suitably mounted at the side of a service pool by beam 28 connected thereto suitably for example by extensions 29 extending over the curb of the pool as shown in FIG. 5. The beam 28 extends to a suitable depth of the pool underwater to shield an operator from undue radiation exposure.

Figure 4:
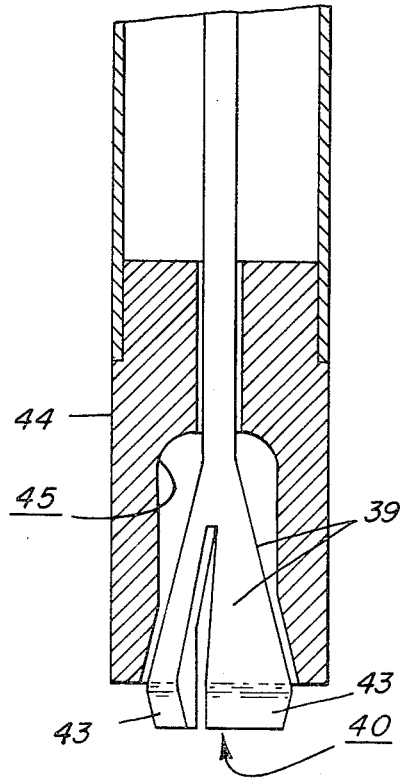
FIG. 4 shows in cross-section a grapple tool for maneuvering fuel rods and malleable sleeves.

To conduct crimping of the malleable sleeve 23 onto a selected fuel rod 24, the fuel rod is initially maneuvered toward the crimping arrangement by a top grapple 30 such as is shown in FIG. 4. Then it is transferred to a side grapple 31 (FIG. 1) and the sleeve 23 is slipped over the puncture hole in the fuel rod 24 to be sealed. After the rod 24 and sleeve 23 have been inserted between the jaws 18, 21, hydraulic pressure from a source 32 (FIG. 5) is applied through hoses 32' to close the jaws 18, 21 and to produce circumferential sealing or crimping ridges 33' shown in FIG. 3, as will be explained hereinafter. A suitable source 32 is ENERPAC pump model EH-464; suitable hoses 32' are of type H-9260 also by ENERPAC.

Since this invention has to do with grasping, clenching, and crimping of a fuel rod or a malleable sleeve, the tools performing these functions deserve attention. Special attention will be devoted to the jaws 18, 21 of the crimping arrangement and how they fashion the sealing ridges 33'.

First, the grapple tools used prior to crimping are examined. These guide the fuel rod 24 and sleeve 23 into crimping position.

Let us assume at this point that a selected fuel rod 24 has already been withdrawn from its bundle and punctured. Furthermore, let us assume that the fuel rod 24 has been removed by grasping the rod 24 at its upper end plug 25 with a tool such as the top grapple 30 shown in FIG. 4. To illustrate the operation of the top grapple 30—which incidentially is very similar to the side grapple 31 shown in FIGS. 1 and 5—a cross-section of the tool is shown in FIG. 4.

A brief review of the structure of the top grapple 30 follows. Specifically, FIG. 4 shows the top grapple including an outer tubular housing 36 encasing a concentric inner partially threaded rod 37. Suitable fixedly mounted on the top of the rod is a handle 38 in the form of a cross bar. The bottom end of the rod 37 has suitably fixedly coupled thereto a split-sided collet 39 defining a concave recess 40. The sides 43 of the collet 39 accordingly flex or bend inwardly as well as outwardly. The lower end of the tubular housing 36 is plugged by a piece 44 effective for suitably centering the rod 37. The piece defines a suitably sized inner recess 45 for receiving the collet 39 and bearing against its sides 43 to force them inwardly when the rod 37 is upwardly withdrawn. Suitably mounted on the threaded portion of the rod is a wheel 46 defining a threaded inner hole, which can bear against the upper end 46' of the tubular housing 36 and which prevents downward withdrawal of the collet 39.

For operation, the top grapple 30 holds a fuel rod 24 by inserting its end plug 25 into the collet 39 and tightening the wheel 46 until the sides 43 of the collet 39 grasp the end plug 25 for lifting and maneuvering the fuel rod 24.

However, the fuel rod 24 cannot be laterally inserted between the jaws 18, 21 of housing 10 by the top grapple. Instead, the fuel rod 24 is transferred from the top grapple 30 to a side grapple 31 such as that shown in FIGS. 1 and 5. The side grapple 31 additionally serves as a lower abutment for the malleable sleeve 23, preventing the sleeve from sliding past the puncture. In fact, by suitably grasping the fuel rod 24 with the side grapple 31, it is possible to position the malleable sleeve 23 directly over the puncture hole to be sealed.

As noted above, the side grapple 31 is very similar in principle of operation and structure to the top grapple 30. Both grapples 30, 31 include a outer tubular housing 36; both employ a centrally disposed inner rod 37 including a threaded portion. In both cases, a cross bar or handle 38 is suitably fixedly mounted on the top end of the inner rod 37. Additionally, both include a wheel 46 defining a threaded hole for mounting on the threaded portion of the inner rod 37 to bear against the top end of the outer housing 36. By suitably turning the wheel 46, the inner rod 37 can be drawn upward through the outer housing 36.

Figure 3:
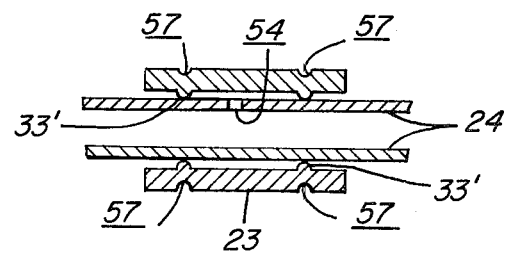
FIG. 3 is an axial cross-section of a punctured fuel rod depicting the hole through which fission gases leak, the malleable sleeve containing the gases, and the sealing ridges crimped into the malleable sleeve to strangle the fuel rod on both sides of the puncture hole.

A major difference between the top and side grapple 30, 31 is the piece 44 connected to the lower end of the outer housing 36. In the case of the side grapple 31, a small box 47 is suitably mounted on the lower end of the outer housing 36. The box 47 is preferably a hollow piece for mounting a pair of fingers 48 on pivots such as pins 49. Suitably coupled to the lower end of the inner rod 37 is a cone 52 of diverging diameter in the downward vertical direction. When the cone 52 is withdrawn upwardly by pulling the inner rod 37 through the outer housing 36 and perhaps even locking the position of the inner rod 37 by turning wheel 46 against the upper end 46' of the outer housing 36, the cone 52 spreads the ends of the fingers 48 within the small box 47. This spreading causes the ends of the fingers 48 (including the vertical extensions 53 thereof) to contract and to grasp the fuel rod 24 to be puncture sealed. It is important that the upper end of the fingers 48 is located about one half the height of a malleable sleeve below the puncture hole or site 54 (FIG. 3). This insures proper sealing of the targeted puncture hole 54, when the malleable sleeve 23 has been positioned over the puncture in the fuel rod 24.

After the fuel rod 24 has suitably been transferred from the top grapple 30 to the side grapple 31, the malleable sleeve 23 may be maneuvered toward the fuel rod 24. Since the top grapple 30 holding the fuel rod 24 has been set aside, the end plug 25 and the remaining upper portions of the fuel rod 24 are free for the malleable sleeve 23 to be slipped thereon.

Accordingly, the malleable sleeve 23 is carried near the fuel rod 24 by a top grapple 30 much like the one previously holding the fuel rod 24 but having a substantially larger collet 39. The sleeve 23 is slipped over the end plug 25, dropping to the level of the fingers 48 of the side grapple 31 and thus covering the puncture hole 54 to be sealed.

Next, the fuel rod 24, with the malleable sleeve 23 properly positioned thereon is inserted (preferably from below) between the jaws 18, 21 of the housing 10 for crimping operation. To align properly the jaws 18, 21 for cooperative closure and to insure that the sealing ridges do in fact perform a sealing operation, an aligning block 50 is suitably mounted within the housing 10, between the top 14 and bottom 15. The aligning block 50 allows the moveable jaw 21 to slide against its surface. The aligning block 50 prevents the moveable jaw 21 from rotating about the axis of shaft 20. To survive underwater in the service pool, the aligning block 50 is preferably constructed of stainless steel, as are most other parts of the housing.

Hydraulic pressure from source 32 is applied through one of hoses 32' to effect crimping. The piston and shaft 20 are then withdrawn by applying pressure through the other of said hoses. A suitable commercially available hydraulic cylinder 19 for installation in the housing 10 of this invention is model RD-93 by ENERPAC, which delivers up to 6,500 psig for crimping. By this method, spaced circumferential jaw crimping ridges 33 on the surface contour 22 of jaws 18, 21 impress a pair of spaced circumferential depressions 57 in the outer surface of malleable sleeve 23. A corresponding pair of spaced circumferential sealing ridges 33' is raised on the inner surface of the sleeve. One sealing ridge 33' is projected for each side of the puncture hole 54. Of course, a greater number of circumferential ridges 33' could accomplish sealing as well.

The sleeve 23 rigidly holds its shape after crimping in part due to the thickness of the malleable sleeve and also due to the malleable aluminum material utilized. Other suitable materials may be substituted. Whatever the material, it is displaced by the crimping ridges 33 of the jaws 18, 21. However, the sleeve 23 retains its shape for an extended period of time and offers an indefinite term of effective sealing operation. Crimping creates complementary circumferential sealing ridges 33' and depressions 57 on the surfaces of the malleable sleeve. The inner ridges 33' provide seals on either side of the puncture hole 54. These ridges 33' and depressions 57 are impressed on the sleeve 23 by forceful crimping by the jaws 18 and 21 which together define a pair of spaced circumferential crimping ridges 33 in their surface contour 22. The crimped seal is tight. In fact, a slight inward deformation of the fuel rod 24 at each of the impressed circumferential sealing ridges is anticipated.

The above description pertains to a single possible embodiment of the instant invention and is susceptible of reasonable modifications by those skilled in the art. However, this invention is not meant to be limited to the preferred embodiment just shown and described. Rather, the claims set forth the inventive concept and are intended to cover all modifications coming within the spirit and scope of the invention described herein.

What is claimed is:

1. Apparatus for sealingly crimping a malleable sleeve over a hole in a nuclear fuel rod while said rod is submerged below the water level in a nuclear reactor service pool, comprising:
    a pair of jaws including a fixed and a movable jaw which together define at least a pair of mutually spaced circumferential jaw ridges;
    means for selectively positioning said pair of jaws below said water level adjacent a wall of said pool;
    means for maneuvering said sleeve and said fuel rod into position between said pair of jaws such that said hole is located between said jaw ridges and said sleeve surrounds said fuel rod and covers said hole;
    a source of hydraulic pressure; and
    means for applying said hydraulic pressure to urge said movable jaw against said fixed jaw, said pair of mutually spaced jaw ridges being effective to impress a corresponding pair of mutually spaced, circumferential depressions on the outer surface of said malleable sleeve and to raise corresponding mutually spaced, circumferential sealing ridges on the inner surface of said malleable sleeve in gas tight contact with said fuel rod on opposite sides of said hole;
    whereby the leakage of fission gas from said fuel rod through said hole is contained.

2. Apparatus as recited in claim 1, wherein said malleable sleeve is fashioned of aluminum.

3. Apparatus as recited in claim 1, wherein said means for applying said hydraulic pressure comprises an hydraulic cylinder and a piston, said piston taking the form of a shaft fixedly coupled to said movable jaw, said shaft being adapted to drive said movable jaw between open and closed positions relative to said fixed jaw.

4. Apparatus as recited in claim 2, wherein said aluminum is annealed.

5. Apparatus as recited in claim 2, wherein said aluminum is 6061 series aluminum.

6. Apparatus as recited in claim 1 and further including a housing supporting said pair of jaws; said selective positioning means comprising:
    a beam adapted to hook over the edge of said wall above said water level; and
    an extension rigidly depending from said beam into said water, opposite ends of said extension being attached to said beam and to said housing respectively.

7. Apparatus as recited in claim 6, wherein said housing comprises a rectangular frame including a plurality of flat panels, one of said panels being attached to said extension;
    said jaws being supported by a pair of opposite panels of said frame, said movable jaw including a planar guide surface at one side thereof;
    said apparatus further comprising means independent of said fixed jaw for preventing said moveable jaw from rotating relative to said fixed jaw, said rotation prevention means including an aligning block attached to one of said panels intermediate said pair of opposite panels, said aligning block including a planar aligning surface adapted to contact said guide surface during the motion of said moveable jaw relative to said fixed jaw.

8. Apparatus as recited in claim 1, wherein said maneuvering means includes a top grapple for positioning said sleeve on said fuel rod; and
    a side grapple for positioning said sleeve-bearing fuel rod between said jaws for crimping.

9. In a nuclear reactor, a method for containing the leakage of fission gas through a hole in an elongate nuclear fuel rod while said fuel rod is submerged below the water level in the service pool of said reactor, said fuel rod normally residing in a submerged, vertically positioned fuel bundle containing a plurality of said fuel rods;
    said method comprising the steps of:
    withdrawing said fuel rod lengthwise from said fuel bundle;
    positioning a malleable sleeve over said hole on said withdrawn, submerged fuel rod;
    positioning said sleeve-bearing fuel rod between a pair of jaws;
    crimping said sleeve onto said fuel rod with said pair of jaws, said crimping step being effective to raise a pair of mutually spaced circumferential sealing ridges on the inner surface of said sleeve to form a gas tight seal with said fuel rod on opposite sides of said hole;
    removing said fuel rod from said pair of jaws with said sleeve crimped over said hole; and
    returning said fuel rod lengthwise to said fuel bundle;
    whereby the leakage of fission gas through said hole in said fuel rod is contained.

10. The method of claim 9, wherein said steps further comprise:
    grasping said fuel rod at its top by means of a top grapple during said withdrawal step;
    transferring said rod from said top grapple to a side grapple, said side grapple grasping said fuel rod below said hole;
    grasping said sleeve with said top grapple during said sleeve positioning step and slipping said sleeve over the top of said fuel rod while the latter is held by said side grapple, said side grapple being effective to arrest said sleeve on said fuel rod in a position where said sleeve covers said hole.

11. The method of claim 9, wherein said jaws are adapted to move in a horizontal direction for crimping purposes;
    the positioning of said sleeve-bearing fuel rod between said jaws and its removal therefrom being carried out from below said jaws.

* * * * *